(12) United States Patent
Draper

(10) Patent No.: US 8,245,492 B2
(45) Date of Patent: Aug. 21, 2012

(54) POWER PLANT AND METHOD OF OPERATION

(75) Inventor: Samuel David Draper, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/217,405

(22) Filed: Aug. 25, 2011

(65) Prior Publication Data
US 2012/0023955 A1 Feb. 2, 2012

(51) Int. Cl.
*F02C 7/08* (2006.01)
*F02G 1/00* (2006.01)
*F02G 3/00* (2006.01)

(52) U.S. Cl. .......................... 60/39.52; 60/39.5; 60/772

(58) Field of Classification Search .................. 60/775, 60/785, 39.5, 39.52, 39.182, 772
See application file for complete search history.

(56) References Cited

U.S. PATENT DOCUMENTS

| | | |
|---|---|---|
| 2,621,475 A | 12/1952 | Loy |
| 2,646,663 A | 7/1953 | Sedille |
| 3,685,287 A | 8/1972 | Dooley |
| 3,866,411 A | 2/1975 | Marion et al. |
| 3,949,548 A | 4/1976 | Lockwood, Jr. |
| 4,267,692 A | 5/1981 | Earnest |
| 4,271,664 A | 6/1981 | Earnest |
| 4,313,300 A | 2/1982 | Wilkes et al. |
| 4,330,038 A | 5/1982 | Soukup et al. |
| 4,434,613 A | 3/1984 | Stahl |
| 4,492,085 A | 1/1985 | Stahl et al. |
| 4,528,811 A | 7/1985 | Stahl |
| 4,533,314 A | 8/1985 | Herberling |
| 4,561,245 A | 12/1985 | Ball |
| 4,566,267 A | 1/1986 | Muller et al. |
| 5,165,606 A | 11/1992 | Pelet |
| 5,361,576 A | 11/1994 | Muller |

(Continued)

FOREIGN PATENT DOCUMENTS

EP 1731833 A1 12/2006
(Continued)

OTHER PUBLICATIONS

Disclosure under 37 CFR 1.56 for U.S. Appl. No. 13/217,646, filed Apr. 30, 2012.

(Continued)

*Primary Examiner* — William H Rodriguez
*Assistant Examiner* — Craig Kim
(74) *Attorney, Agent, or Firm* — Sutherland Asbill & Brennan LLP

(57) ABSTRACT

A power plant and method of operation are provided. The power plant comprises at least one main air compressor and at least one gas turbine assembly. Each gas turbine assembly comprises a turbine combustor for mixing a compressed ambient gas with a recirculated low oxygen content gas flow and a fuel stream to form a combustible mixture for burning to form the recirculated low oxygen content gas flow. A turbine is arranged to be driven by the recirculated low oxygen content gas flow from the turbine combustor. The assembly includes a recirculation loop for recirculating the recirculated low oxygen content gas flow from the turbine to a turbine compressor and a gas flow extraction stream for extracting a portion of the recirculated low oxygen content gas flow for delivery to a carbon monoxide catalyst unit. A portion of the compressed ambient gas is directed to the carbon monoxide catalyst unit.

20 Claims, 4 Drawing Sheets

U.S. PATENT DOCUMENTS

| | | | |
|---|---|---|---|
| 5,400,587 A | 3/1995 | Keller et al. | |
| 5,426,932 A | 6/1995 | Morihara et al. | |
| 5,557,919 A | 9/1996 | Althaus | |
| 5,564,896 A | 10/1996 | Beeck et al. | |
| 5,584,182 A | 12/1996 | Althaus et al. | |
| 5,595,059 A | 1/1997 | Huber et al. | |
| 5,674,066 A | 10/1997 | Hausermann et al. | |
| 5,724,805 A | 3/1998 | Golomb et al. | |
| 5,794,431 A | 8/1998 | Utamura et al. | |
| 5,809,768 A | 9/1998 | Uematsu et al. | |
| 6,050,082 A | 4/2000 | Leonard et al. | |
| 6,082,093 A | 7/2000 | Greenwood et al. | |
| 6,105,362 A | 8/2000 | Ohtomo | |
| 6,202,400 B1 | 3/2001 | Utamura et al. | |
| 6,256,976 B1 | 7/2001 | Kataoka et al. | |
| 6,269,624 B1 | 8/2001 | Frutschi et al. | |
| 6,289,666 B1 | 9/2001 | Ginter | |
| 6,338,240 B1 | 1/2002 | Endo et al. | |
| 6,363,709 B2 | 4/2002 | Kataoka et al. | |
| 6,430,915 B1 | 8/2002 | Wiant et al. | |
| 6,622,470 B2 | 9/2003 | Viteri et al. | |
| 6,637,183 B2 | 10/2003 | Viteri et al. | |
| 6,848,249 B2 | 2/2005 | Coleman et al. | |
| 6,851,266 B2 | 2/2005 | Liebig | |
| 6,868,677 B2 | 3/2005 | Viteri et al. | |
| 6,910,335 B2 | 6/2005 | Viteri et al. | |
| 7,007,487 B2 | 3/2006 | Belokon | |
| 7,032,388 B2 | 4/2006 | Healy | |
| 7,089,743 B2 * | 8/2006 | Frutschi et al. | 60/772 |
| 7,127,898 B2 | 10/2006 | Healy | |
| 7,383,686 B2 | 6/2008 | Aycock et al. | |
| 7,490,472 B2 | 2/2009 | Lynghjem et al. | |
| 7,503,178 B2 | 3/2009 | Bücker et al. | |
| 7,516,609 B2 * | 4/2009 | Agnew | 60/39.52 |
| 7,726,114 B2 | 6/2010 | Evulet | |
| 7,739,864 B2 | 6/2010 | Finkenrath et al. | |
| 7,895,822 B2 | 3/2011 | Hoffmann et al. | |
| 2003/0051481 A1 | 3/2003 | Priestley et al. | |
| 2004/0011057 A1 | 1/2004 | Huber | |
| 2004/0134194 A1 | 7/2004 | Roby et al. | |
| 2005/0028529 A1 | 2/2005 | Bartlett et al. | |
| 2005/0150229 A1 | 7/2005 | Baer et al. | |
| 2007/0006592 A1 | 1/2007 | Balan et al. | |
| 2007/0034171 A1 | 2/2007 | Griffin et al. | |
| 2007/0068167 A1 * | 3/2007 | Patel et al. | 60/772 |
| 2007/0125063 A1 | 6/2007 | Evulat | |
| 2007/0125064 A1 | 6/2007 | Sonoda | |
| 2007/0125091 A1 | 6/2007 | Roby et al. | |
| 2007/0220896 A1 | 9/2007 | Varatharajan et al. | |
| 2008/0010967 A1 | 1/2008 | Griffin et al. | |
| 2008/0104938 A1 | 5/2008 | Finkenrath et al. | |
| 2008/0104939 A1 | 5/2008 | Hoffmann et al. | |
| 2008/0120960 A1 | 5/2008 | Agnew | |
| 2008/0309087 A1 | 12/2008 | Evulet et al. | |
| 2009/0199566 A1 | 8/2009 | Lebas et al. | |
| 2009/0218821 A1 | 9/2009 | Elkady et al. | |
| 2009/0280003 A1 | 11/2009 | Schriner et al. | |
| 2009/0284013 A1 * | 11/2009 | Anand et al. | 290/52 |
| 2009/0301054 A1 | 12/2009 | Simpson et al. | |
| 2010/0018218 A1 | 1/2010 | Riley et al. | |
| 2010/0115960 A1 | 5/2010 | Brautsch et al. | |
| 2010/0126181 A1 | 5/2010 | Ranasinghe et al. | |
| 2010/0170218 A1 | 7/2010 | Eluripati et al. | |
| 2010/0180565 A1 | 7/2010 | Draper | |
| 2011/0067408 A1 | 3/2011 | Maly | |
| 2011/0138766 A1 | 6/2011 | ELKady et al. | |
| 2011/0289898 A1 | 12/2011 | Hellat et al. | |

FOREIGN PATENT DOCUMENTS

| | | |
|---|---|---|
| EP | 2078827 A1 | 7/2009 |
| EP | 2206959 A2 | 7/2010 |

OTHER PUBLICATIONS

Bandar Duraya Al-Anazi, "Enhanced Oil Recovery Techniques and Nitrogen Injection," CSEG Recorder, 2007, 28-33.

* cited by examiner

POWER PLANT AND METHOD OF OPERATION

BACKGROUND OF THE INVENTION

The subject matter of the present disclosure relates generally to the field of electric power plants, and more particularly to methods of operating stoichiometric exhaust gas recirculation turbine systems. Various types of gas turbine systems are known and in use for electricity generation in power plants. Typically, the gas turbine systems include a turbine compressor for compressing an air flow and a turbine combustor that combines the compressed air with a fuel and ignites the mixture to generate an exhaust gas. The exhaust gas may then be expanded through a turbine, thereby causing the turbine to rotate, which in turn may be connected to a turbine generator via a turbine shaft, for power generation. Gas turbines have traditionally used excess air within the combustion process to control turbine temperatures and manage undesirable emissions. This often results in an exhaust stream with large amounts of excess oxygen.

Accordingly, there exists a need for a power plant arrangement that uses a gas turbine system that may operate without an exhaust stream with large amounts of excess oxygen. Furthermore, it would be desirable for the power plant arrangement to provide for the option to further reduce emissions through treatment of exhaust gases and/or to recover streams of carbon dioxide, nitrogen, and water.

BRIEF DESCRIPTION OF THE INVENTION

In one aspect, a power plant arrangement is provided. The power plant arrangement includes at least one main air compressor for compressing ambient air into a compressed ambient gas and at least one gas turbine assembly. Each gas turbine assembly includes a turbine combustor, fluidly connected to the main air compressor, for mixing the compressed ambient gas with at least a first portion of a recirculated low oxygen content gas flow and a fuel stream to form a combustible mixture and for burning the combustible mixture and forming the recirculated low oxygen content flow. The gas turbine assembly further includes a turbine connected to the turbine combustor and to a turbine shaft. The turbine is arranged to be driven by the recirculated low oxygen content gas flow from the turbine combustor. The assembly further comprises a turbine compressor, fluidly connected to the turbine combustor, and connected to the turbine shaft and arranged to be driven thereby. The assembly also comprises a recirculation loop for recirculating the recirculated low oxygen content gas flow from the turbine to the turbine compressor. The assembly further includes a recirculated gas flow extraction stream for extracting at least a second portion of the recirculated low oxygen content gas flow from the gas turbine assembly and delivering the at least a second portion of the recirculated low oxygen content gas flow to a carbon monoxide catalyst unit. At least a second portion of the compressed ambient gas flow is directed from the at least one main air compressor to the carbon monoxide catalyst unit.

In another aspect, a method for operating a power plant is provided. The method includes compressing ambient air with at least one main air compressor to form a compressed ambient gas flow, delivering the compressed ambient gas flow to a turbine combustor of at least one gas turbine assembly, and mixing the compressed ambient gas flow with at least a first portion of a recirculated low oxygen content gas flow and a fuel stream to form a combustible mixture and burning the mixture in the turbine combustor to produce the recirculated low oxygen content gas flow. The method further comprises driving a turbine using the recirculated low oxygen content gas flow and driving a turbine compressor fluidly connected to the turbine combustor. The method also comprises recirculating the recirculated low oxygen content gas flow from the turbine to the turbine compressor using a recirculation loop and extracting at least a second portion of the recirculated low oxygen content gas flow from the gas turbine assembly using a recirculated gas flow extraction stream. The method further comprises delivering the at least a second portion of the recirculated low oxygen content gas flow to a carbon monoxide catalyst unit and adding a least a second portion of the compressed ambient gas flow from the at least one main air compressor to the carbon monoxide unit. Additionally, the method comprises producing a high pressure stream of gas comprising carbon monoxide with the carbon monoxide catalyst unit.

Additional aspects will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

These and other features, aspects, and advantages of the present invention will become better understood when the following detailed description is read with reference to the accompanying drawings, where the components are not necessarily to scale, and in which corresponding reference numerals designate corresponding parts throughout the drawings, wherein.

DETAILED DESCRIPTION OF THE INVENTION

Figure 1:
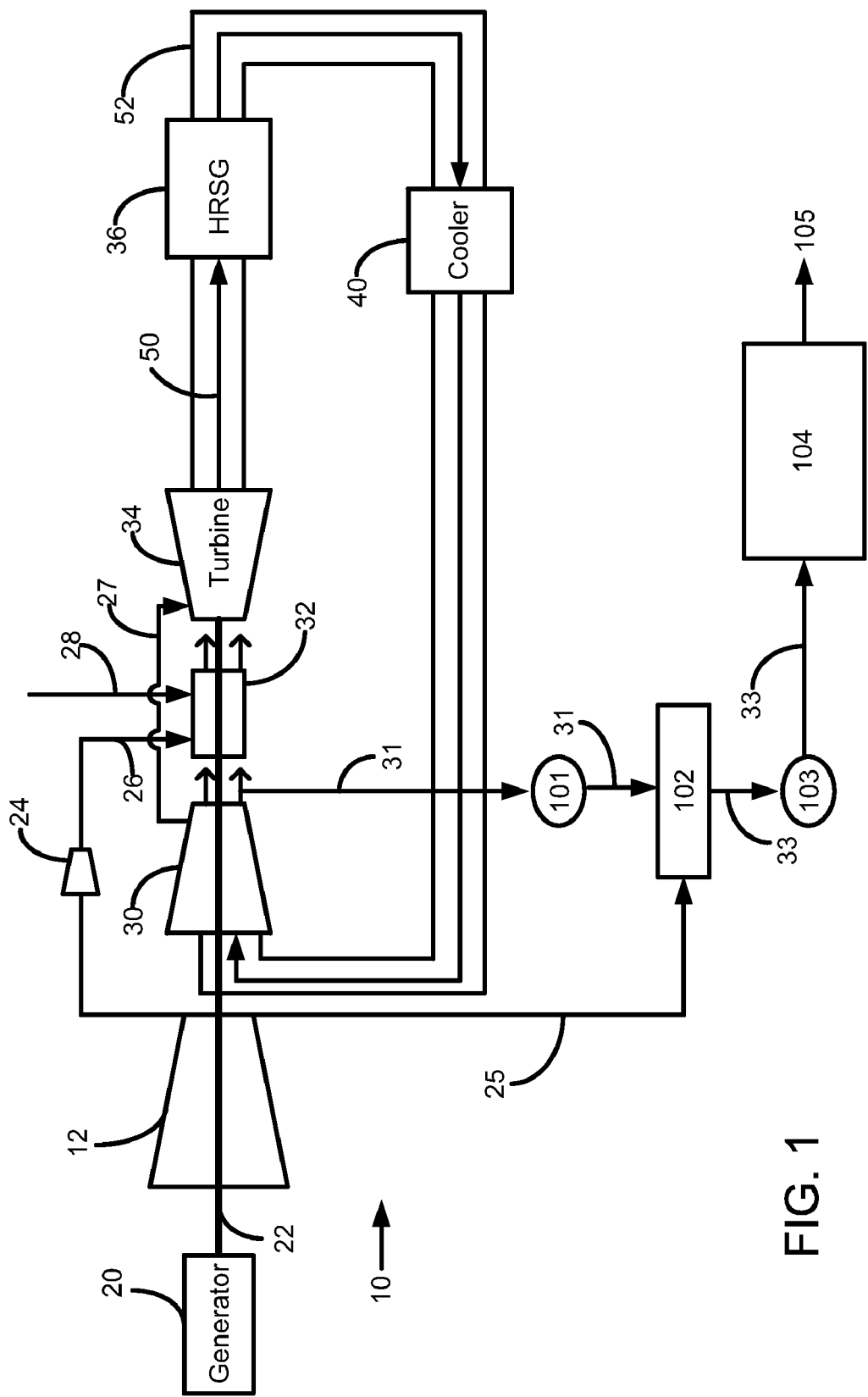
FIG. 1 is a diagrammatical illustration of an exemplary power plant arrangement 10 in accordance with an embodiment of the present invention.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment," "an embodiment," or "embodiments" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Recent requirements in the power generation industry have necessitated the development of a gas turbine arrangement that may be configured to consume substantially all of the oxygen in the air working fluid to produce an essentially oxygen-free exhaust stream. These streams may be more easily suited to emissions reductions using $NO_x$ catalysts. Additionally, these streams may be better suited to post combustion carbon capture solutions due to the low oxygen concentrations. Furthermore, a substantially oxygen-free exhaust stream may be more easily suited to enhanced oil recovery applications.

A substantially oxygen-free exhaust from a gas turbine may be accomplished by stoichiometric burning in the combustion system. That is, the oxygen-containing fresh air supply may be matched to the fuel flow such that the combustion process operates with substantially stoichiometric combustion.

A stoichiometric combustion reaction of methane and oxygen is illustrated below:

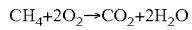

$$CH_4 + 2O_2 \rightarrow CO_2 + 2H_2O$$

Stoichiometric combustion results in gas temperatures that may be too high for the materials and cooling technology employed in gas turbine engines. In order to reduce those high temperatures, a portion of the gas turbine exhaust products may be recirculated back to the combustion system to dilute the combustion temperatures. Ideally, this diluent gas should also be essentially oxygen free so as to not introduce additional oxygen into the system and thereby reduce the advantages of stoichiometric combustion. The gas turbine application using stoichiometric combustion and recirculated exhaust gas is referred to as Stoichiometric Exhaust Gas Recirculation (SEGR).

The SEGR system may use a supply of high pressure air fed directly into the combustion process to provide the oxygen for combustion. This air may be supplied by an auxiliary compressor. In practice, the ability of an auxiliary compressor to provide air at the pressure and flow rate required by the SEGR gas turbine may not be matched across all operating ranges of load and ambient temperature experienced by the system. The auxiliary compressor may allow the compressor to provide more air at times than is required by the gas turbine. Further, the auxiliary compressor may be designed with the capability to always provide more air than is required by the gas turbine. It some situations, it may be necessary to discharge some of the air compressed by the auxiliary compressor to the atmosphere.

As discussed in detail below, embodiments of the present invention may function to minimize emissions in gas turbine power plant systems by using an SEGR cycle that may enable substantially stoichiometric combustion reactions for power production. The SEGR gas turbine may be configured so as to provide a low oxygen content exhaust. This low oxygen content exhaust may be used with an $NO_x$ reduction catalyst to provide an exhaust stream that may also be free of $NO_x$ contaminants.

In some embodiments, a portion of a compressed ambient gas flow may be delivered from the main air compressor to a carbon monoxide catalyst unit such that the carbon monoxide catalyst unit may provide a stream of carbon dioxide. In some of the specific embodiments, the present technique may include using the SEGR cycle to provide low oxygen content streams of carbon dioxide and nitrogen that may be used in enhanced oil recovery applications.

Power Plant Arrangements

Turning now to the drawings and referring first to FIG. 1 an exemplary power plant arrangement 10 is illustrated. The power plant arrangement 10 may include a main air compressor 12 for compressing ambient air into at least a first portion of a compressed ambient gas flow 26. Further, the power plant arrangement 10 may include a turbine combustor 32 that may be fluidly connected to the main air compressor 12. The turbine combustor 32 may be configured to receive the at least a first portion of the compressed ambient gas flow 26 from the main air compressor 12, at least a first portion of a recirculated low oxygen content gas flow 50 from a turbine compressor 30, and a fuel stream 28, to form a combustible mixture and may burn the combustible mixture to generate the recirculated low oxygen content gas flow 50.

In addition, the power plant arrangement 10 may include a turbine 34 located downstream of the turbine combustor 32. The turbine 34 may be configured to expand the recirculated low oxygen content gas flow 50 and may drive an external load such as a turbine generator 20 via a turbine shaft 22 to generate electricity. As illustrated in FIG. 1, the main air compressor 12 and the turbine compressor 30 may be driven by the power generated by the turbine 34 via the turbine shaft 22.

As illustrated in FIG. 1, in some embodiments, the turbine shaft 22 may be a "cold-end drive" configuration, meaning the turbine shaft 22 may connect to the turbine generator 20 at the compressor end of the turbine assembly. In other embodiments, the turbine shaft 22 may be a "hot-end drive" configuration, meaning the turbine shaft 22 may connect to the turbine generator 20 at the turbine end of the turbine assembly.

As used herein, the term "recirculated low oxygen content gas flow" refers to the gas flow generated by the burning of the combustible mixture in the turbine combustor 32 and flowing through a recirculation loop 52. In some embodiments, the term "low oxygen content" refers to an oxygen content of below about 5 vol %, below about 2 vol %, or below about 1 vol %.

As used herein, the term "gas turbine assembly" refers to all listed components of the power plant arrangements except for the main air compressor 12. In some embodiments, the term "gas turbine assembly" may refer to all listed components of the power plant arrangement except for the main air compressors.

In some embodiments, the recirculated low oxygen content gas flow 50 may be directed from the turbine 34 through the recirculation loop 52 to a heat recovery steam generator 36 for the generation of steam. A steam turbine may further be configured to generate additional electricity using the steam from the heat recovery steam generator 36, and the steam turbine may be connected to a steam generator. In some embodiments, the steam turbine may be arranged to be connected to the turbine shaft 22. The recirculated low oxygen content gas flow 50 may then be directed back into the recirculation loop 52 to a recirculated gas flow cooler 40. In still other embodiments, the recirculation loop 52 may not contain a heat recovery steam generator 36 and the recirculated low oxygen content gas flow 50 may instead be introduced directly into the recirculated gas flow cooler 40 upon exit from the turbine 34. In some embodiments, the recirculation loop 52 may not comprise the recirculated gas flow cooler 40.

The recirculated gas flow cooler 40 may be incorporated into the recirculation loop 52 anywhere downstream from the turbine 34. The recirculated gas flow cooler 40 may be configured to lower the temperature of the recirculated low oxygen content gas flow 50 to a suitable temperature for downstream delivery into the turbine compressor 30 via the recirculation loop 52. In some embodiments, a suitable temperature may be below about 66° C., below about 49° C., or below about 45° C.

In embodiments the power plant arrangement 10 may include a recirculated gas flow extraction stream 31 for extracting at least a second portion of the recirculated low oxygen content gas flow 50 from the gas turbine assembly and delivering the at least a second portion of the recirculated low oxygen content gas flow 50 to a carbon monoxide catalyst unit 102. In some embodiments, the recirculated gas flow extraction stream 31 may be in fluid communication with an output of the turbine compressor 30. In other embodiments, the recirculated gas flow extraction stream 31 may be attached at any point of the recirculation loop 52.

In embodiments, at least a second portion of the compressed ambient gas flow 25 may be directed to the carbon monoxide catalyst unit 102. The at least a second portion of the compressed ambient gas flow 25 may be used by the carbon monoxide catalyst unit 102 to react with carbon monoxide in the at least a second portion of the recirculated low oxygen content gas flow 50 and may thereby produce a high pressure stream of gas 33 comprising carbon dioxide. In some embodiments, the high pressure stream of gas 33 may be delivered to a high pressure heat recovery steam generator 104 that may be located downstream of and in fluid connection with the carbon monoxide catalyst unit 102. Upon receiving the high pressure stream of gas 33, the high pressure heat recovery steam generator 104 may generate steam, which in turn may be used to generate additional electricity using a post-catalyst steam turbine and a post-catalyst steam generator.

In embodiments, a gas sensing unit 101 may be fluidly connected to the recirculated gas flow extraction stream 31. The gas sensing unit 101 may be used to analyze the content of the at least a second portion of the recirculated low oxygen content gas flow 50. In some embodiments, a second gas sensing unit 103 may be fluidly connected to the output of the carbon monoxide catalyst unit 103. The second gas sensing unit 103 may be used to analyze the content of the high pressure stream of gas 33. By providing sensors both upstream of and downstream of the carbon monoxide catalyst unit 103, it may be possible to adjust parameters of the power plant to minimize the production of carbon monoxide by the turbine combustor 32 and to maximize the consumption of carbon monoxide by the carbon monoxide catalyst unit 103 while maintaining a stream comprising carbon monoxide, that is substantially oxygen-free, for enhanced oil recovery applications.

In some embodiments, the gas turbine assembly may further comprise a secondary flow path 27 that may deliver at least a third portion of the recirculated low oxygen content gas flow 50 from the turbine compressor 30 to the turbine 34 as a secondary flow. The secondary flow may be used to cool and to seal the turbine 34, including individual components of the turbine 34 such as the turbine shroud, the turbine nozzle, the turbine blade tip, the turbine bearing support housing, and the like. After cooling and sealing the turbine 34 and any individual turbine components, the secondary flow may be directed into the recirculation loop 52 downstream of the turbine 34.

In some embodiments, a booster compressor 24 may be incorporated downstream of and in fluid connection with the main air compressor 12 and upstream of and in fluid connection with the turbine combustor 32. The booster compressor 24 may further compress the at least a first portion of the compressed ambient gas flow 26 before delivery into the turbine combustor 32.

In still other embodiments, a blower may be fluidly connected to the recirculation loop 52 upstream of or downstream from the recirculated gas flow cooler 40. The blower may be configured to increase the pressure of the recirculated low oxygen content gas flow 50 prior to delivery into the turbine compressor 30 via the recirculation loop 52.

In embodiments, the main air compressor 12 may further comprise adjustable inlet guide vanes to control the flow of air into the main air compressor 12. Additionally, the turbine compressor 30 may further comprise adjustable inlet guide vanes to control the flow of air into the turbine compressor 30.

In some embodiments, the power plant arrangement 10 may include a damper door connected to the recirculation loop 52. The damper door may be opened to vent a portion of the recirculated low oxygen gas content flow 50 to the atmosphere.

Figure 2:
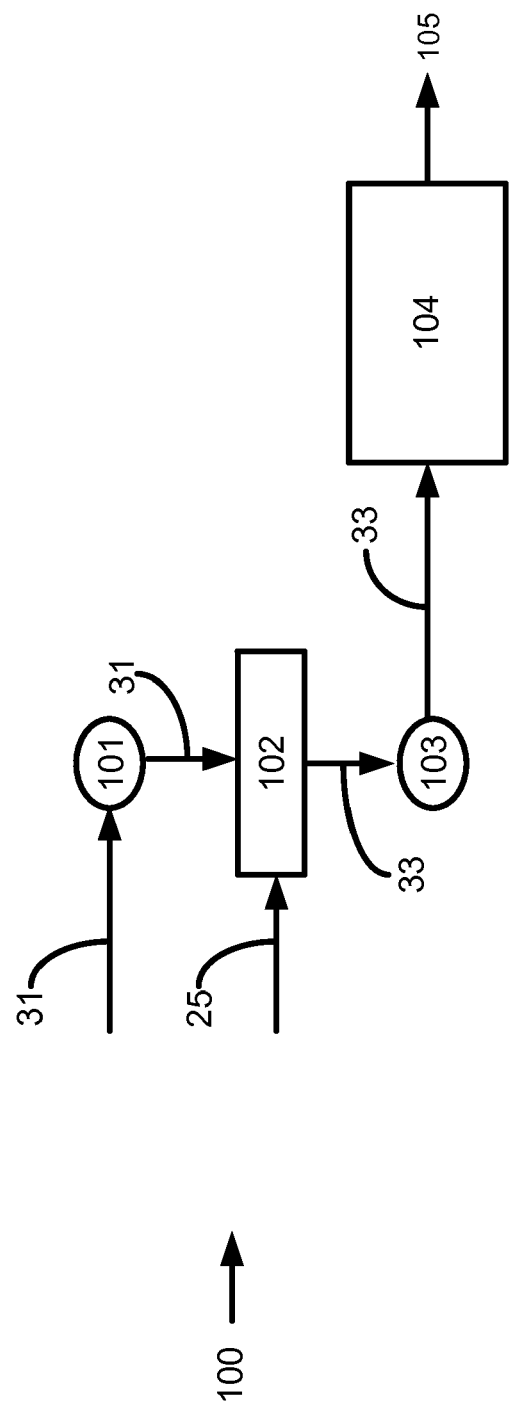
FIG. 2 is a diagrammatical illustration of an exemplary power plant arrangement 100 in accordance with an embodiment of the present invention, wherein the CO catalyst system is shown in a simplified format.

FIG. 2 is a diagrammatical illustration of a portion 100 of the plant arrangement 10 of FIG. 1. In this embodiment, the recirculated gas flow extraction stream 31 may be fluidly connected with the gas sensing unit 101 and then the at least a portion of the recirculated low oxygen content gas flow 50 may be delivered to the carbon monoxide catalyst unit 102. The at least a second portion of the compressed ambient gas flow 25 may be used by the carbon monoxide catalyst unit 102 to react with carbon monoxide in the at least a portion of the recirculated low oxygen content gas flow 50 and may thereby produce a high pressure stream of gas 33 comprising carbon dioxide. The high pressure stream of gas 33 may be fluidly connected to the second gas sensing unit 103 and may then be delivered to the high pressure heat recovery steam generator 104. Finally, a process stream 105 may be delivered from the high pressure heat recovery steam generator 104 and may be further used for enhanced oil recovery applications.

As used herein, the term "slave" is synonymous with the terms secondary, auxiliary, or additional. In the following embodiments, the term "slave" refers to the second of two gas turbine assemblies, but can also mean any additional gas turbine assemblies operated with a main gas turbine assembly such as is the second gas turbine assembly in the following embodiments.

Figure 3:
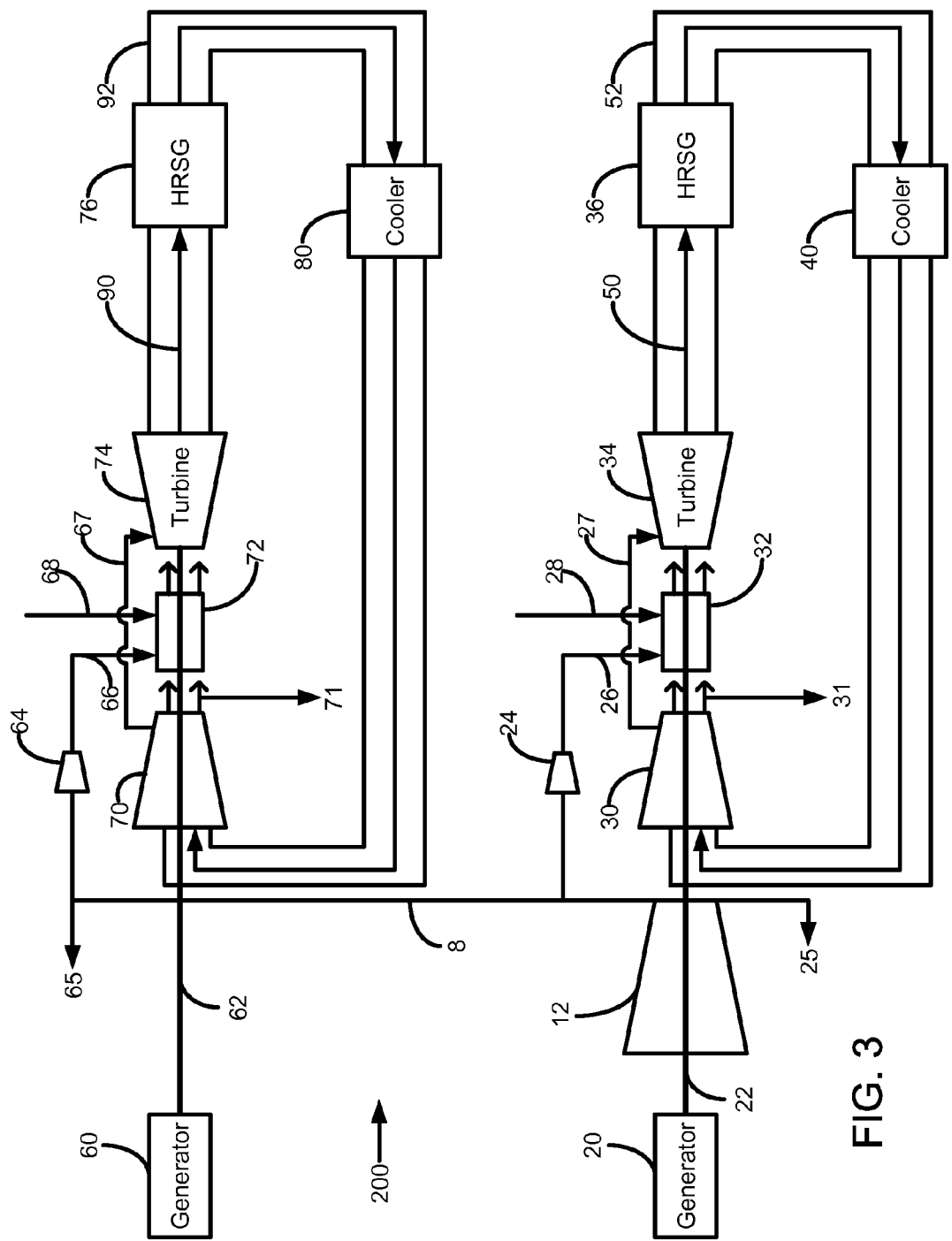
FIG. 3 is a diagrammatical illustration of another exemplary power plant arrangement 200 in accordance with an embodiment of the present invention.

In some embodiments, and as depicted in FIG. 3 as exemplary power plant arrangement 200, the above-described gas turbine assembly may be further connected to a slave gas turbine assembly via an inter-train conduit 8. The main air compressor 12 may compress ambient air into at least a third portion of a compressed ambient gas flow 66 that may be delivered to a slave turbine combustor 72. The slave turbine combustor 72 may be configured to receive the at least a third portion of the compressed ambient gas flow 66 from the main air compressor 12, a slave recirculated low oxygen content gas flow 90 from a slave turbine compressor 70, and a slave fuel stream 68, to form a slave combustible mixture and to burn the slave combustible mixture to generate the slave recirculated low oxygen content gas flow 90. In addition, a slave turbine 74 may be located downstream of the slave turbine combustor 72. The slave turbine 74 may be configured to expand the slave recirculated low oxygen content gas flow 90 and may drive an external load such as a slave turbine generator 60 via a slave turbine shaft 62 to generate electricity.

As illustrated in FIG. 3, in some embodiments, the slave turbine shaft 62 may be a "cold-end drive" configuration, meaning the slave turbine shaft 62 may connect to the slave turbine generator 60 at the compressor end of the turbine assembly. In other embodiments, the slave turbine shaft 62 may be a "hot-end drive" configuration, meaning the slave turbine shaft 62 may connect to the slave turbine generator 60 at the turbine end of the turbine assembly.

As used herein, the term "slave recirculated low oxygen content gas flow" refers to the gas flow generated by the burning of the slave combustible mixture in the slave turbine combustor 72 and flowing through a slave recirculation loop 92. In some embodiments, the term "low oxygen content" refers to an oxygen content of below about 5 vol %, below about 2 vol %, or below about 1 vol %.

In this embodiment, the slave recirculated low oxygen content gas flow 90 may be directed from the slave turbine 74 through the slave recirculation loop 92 to a slave heat recovery steam generator 76 for the generation of steam. A slave steam turbine may be further configured to generate additional electricity using the steam from the slave heat recovery steam generator 76, and the slave steam turbine may be connected to a slave steam generator. In some embodiments, the slave steam turbine may be arranged to be connected to the slave turbine shaft 62. The slave recirculated low oxygen content gas flow 90 may then be directed back into the slave recirculation loop 92 to a slave recirculated gas flow cooler 80. In still other embodiments, the slave recirculation loop 92 may not contain a slave heat recovery steam generator 76 and the slave recirculated low oxygen content gas flow 90 may instead be introduced directly into the slave recirculated gas flow cooler 80 upon exit from the slave turbine 74. In some embodiments, the slave recirculation loop 92 may not comprise the slave recirculated gas flow cooler 80.

The slave recirculated gas flow cooler 80 may be incorporated into the slave recirculation loop 92 anywhere downstream of the slave turbine 74. The slave recirculated gas flow cooler 80 may be configured to lower the temperature of the slave recirculated low oxygen content gas flow 90 to a suitable temperature for downstream delivery into the slave turbine compressor 70 via the slave recirculation loop 92. In some embodiments, a suitable temperature may be below about 66° C., below about 49° C., or below about 45° C.

Figure 4:
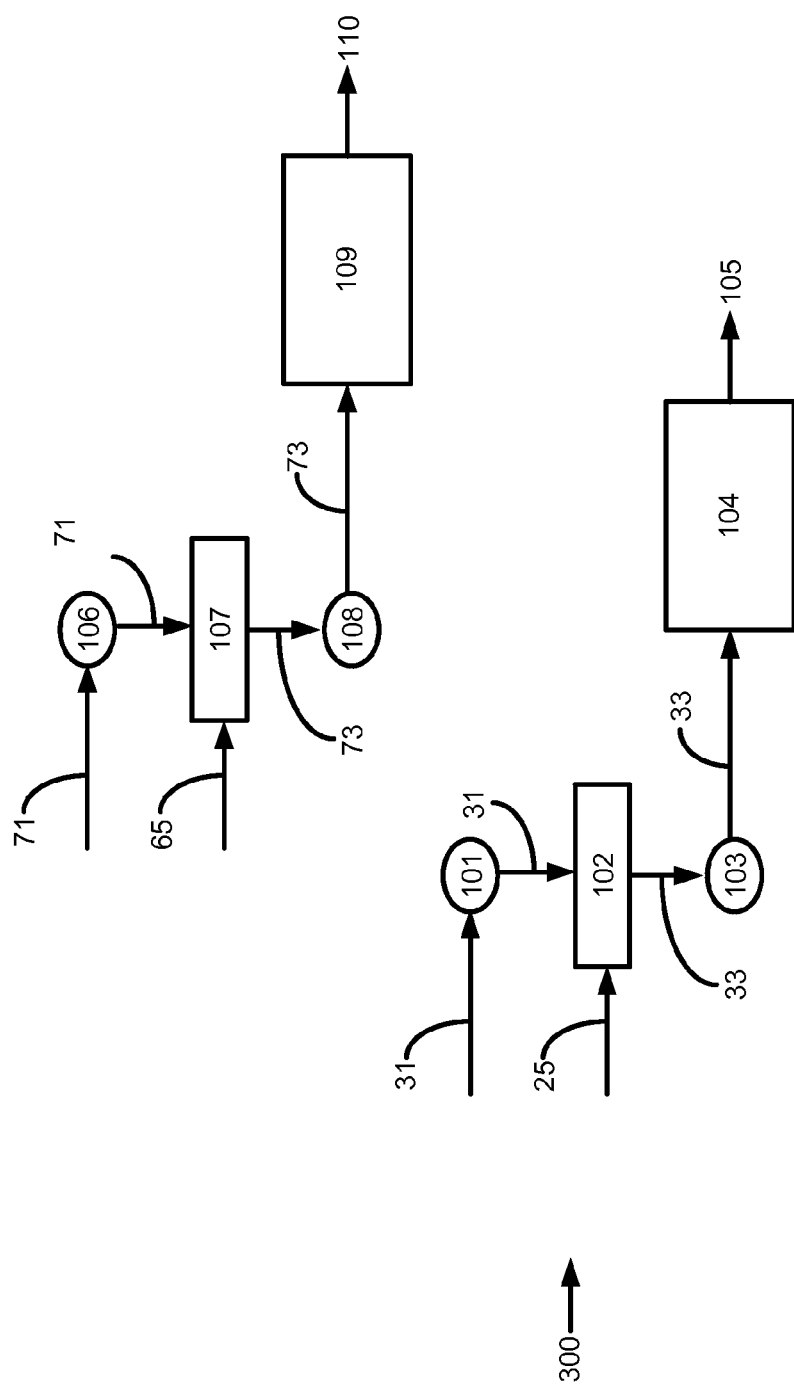
FIG. 4 is a diagrammatical illustration of an exemplary power plant arrangement 300 in accordance with an embodiment of the present invention, wherein two CO catalyst systems are shown in a simplified format.

In some embodiments, the slave gas turbine assembly of the exemplary power plant arrangement 200 may include a slave recirculated gas flow extraction stream 71 for extracting at least a second portion of the slave recirculated low oxygen content gas flow 90 from the slave gas turbine assembly. As illustrated in FIG. 4, the slave recirculated gas flow extraction stream 71 may deliver the at least a second portion of the slave recirculated low oxygen content gas flow 90 to a slave carbon monoxide catalyst unit 107. Returning now to FIG. 3, in this embodiment, the slave recirculated gas flow extraction stream 71 may be in fluid communication with an output of the slave turbine compressor 70. In other embodiments, the slave recirculated gas flow extraction stream 71 may be attached to any point of the slave recirculation loop 92.

As illustrated in FIG. 4, in this embodiment, at least a fourth portion of the compressed ambient gas flow 65 may be directed to the slave carbon monoxide catalyst unit 107. The at least a fourth portion of the compressed ambient gas flow 65 may be used by the slave carbon monoxide catalyst unit 107 to react with carbon monoxide and the at least a second portion of the slave recirculated low oxygen content gas flow 90 and may thereby produce a slave high pressure stream of gas 73 comprising carbon dioxide. In some embodiments, the slave high pressure stream of gas 73 may be delivered to a slave high pressure heat recovery steam generator 109 that may be located downstream from and fluid connection with the slave carbon monoxide catalyst unit 107. Upon receiving the slave high pressure stream of gas 73, the slave high pressure heat recovery steam generator 109 may generate steam, which in turn may be used to generate additional electricity using a slave post-catalyst steam turbine and a slave post-catalyst steam generator.

In some embodiments, a slave gas sensing unit 106 may be fluidly connected with the slave recirculated gas flow extraction stream 71. The slave gas sensing unit 106 may be used to analyze the content of the at least a portion of the slave recirculated low oxygen content gas flow 90. In some embodiments, a second slave gas sensing unit 108 may be fluidly connected to the output of the slave carbon monoxide catalyst unit 107. The second slave gas sensing unit 108 may be used to analyze the content of the slave high pressure stream of gas 73. By providing sensors both upstream of and downstream of the slave carbon monoxide catalyst unit 107, it may be possible to adjust parameters of the power plant to minimize the production of carbon monoxide by the slave turbine combustor 72 and to maximize the consumption of carbon monoxide by the slave carbon monoxide catalyst unit 107 while maintaining a slave stream comprising carbon monoxide, that is substantially oxygen-free, for enhanced oil recovery applications. Finally, a slave process stream 110 may be delivered from the slave high pressure heat recovery steam generator 109 and may be further used for enhanced oil recovery applications.

Returning now to FIG. 3, in some embodiments, the gas turbine assembly may further comprise a slave secondary flow path 67 that may deliver a portion of the slave recirculated low oxygen content gas flow 90 from the slave turbine compressor 70 to the slave turbine 74 as a slave secondary flow. The slave secondary flow may be used to cool and to seal the slave turbine 74, including individual components of the slave turbine 74 such as the turbine shroud, the turbine nozzle, the turbine blade tip, the turbine bearing support housing, and the like. After cooling and sealing the slave turbine 74 and any individual turbine components, the slave secondary flow may be directed into the slave recirculation loop 92 downstream of the slave turbine 74.

In some embodiments, a slave booster compressor 64 may be incorporated downstream from and in fluid connection with the main air compressor 12 and upstream of and in fluid connection with the slave turbine combustor 72. The slave booster compressor 64 may further compress the at least a third portion of the compressed ambient gas flow 66 before delivery into the slave turbine combustor 72.

In still other embodiments, a slave blower may be fluidly connected to the slave recirculation loop 92 upstream of or downstream from the slave recirculated gas flow cooler 80. The slave blower may be configured to increase the pressure of the slave recirculated low oxygen content gas flow 90 prior to delivery into the slave turbine compressor 70 via the slave recirculation loop 92.

In an embodiment, the slave turbine compressor 70 may further comprise adjustable inlet guide vanes to control the flow of air into the slave turbine compressor 70.

In some embodiments, the power plant arrangement 200 may include a slave damper door 78 connected to the slave recirculation loop 92. The slave damper door 78 may be opened to vent a portion of the slave recirculated low oxygen gas content flow 90 to the atmosphere.

In some embodiments, the power plant arrangement comprises one gas turbine assembly. In other embodiments, the power plant arrangement comprises two or more gas turbine assemblies that are fluidly connected by the inter-train conduit 8. As used herein, the term "inter-train conduit" may refer to a fluid connection between two or more gas turbine assemblies and one or more main air compressors. In still other embodiments, the power plant arrangement comprises three or more gas turbine assemblies and one or more additional main air compressors, wherein the additional main air compressors are in fluid connection with each other and with the gas turbine assemblies. In yet other embodiments, the power plant arrangement is configured for substantially stoichiometric combustion. In still other embodiments, the power plant arrangement is configured for substantially zero emissions power production.

In some embodiments, the fuel stream 28 and/or the slave fuel stream 68 may comprise an organic gas, including but not limited to methane, propane, and/or butane. In still other embodiments, the fuel stream 28 and/or the slave fuel stream 68 may comprise an organic liquid, including but not limited to methanol and/or ethanol. In yet other embodiments, the fuel stream 28 and/or the slave fuel stream 68 may comprise a fuel source obtained from a solid carbonaceous material such as coal.

Method of Operation

In one embodiment, a method for operating an exemplary power plant arrangement 10 is provided, wherein ambient air may be compressed using a main air compressor 12 to form a compressed ambient gas flow. The compressed ambient gas flow may be delivered to at least one gas turbine assembly. At least a first portion of the compressed ambient gas flow 26 may be delivered to a gas turbine assembly. The at least a first portion of the compressed ambient gas flow 26 may be delivered directly to a turbine combustor 32. The at least a first portion of the compressed ambient gas flow 26 may then be mixed with at least a first portion of a recirculated low oxygen content gas flow 50 and a fuel stream 28 to form a combustible mixture. The combustible mixture may be burned in the turbine combustor 32 to produce the recirculated low oxygen content gas flow 50.

In some embodiments, a turbine 34 may be driven using the recirculated low oxygen content gas flow 50, thereby causing the turbine 34 to rotate. As used herein, the term "driven using the recirculated low oxygen content gas flow" means the recirculated low oxygen content gas flow 50 expands upon exit from the turbine combustor 32 and upon entrance into the turbine 34, thereby causing the turbine 34 to rotate.

In some embodiments, rotation of the turbine 34 may cause the turbine shaft 22 and also the turbine compressor 30 to rotate. The turbine shaft 22 may rotate in the turbine generator 20, such that rotation of the turbine shaft 22 may cause the turbine generator 20 to generate electricity. In this embodiment, the turbine compressor 30 may be fluidly connected to the turbine combustor 32 such that the turbine compressor 30 may compress and deliver the recirculated low oxygen content gas flow 50 to the turbine combustor 32.

As illustrated in FIG. 1, in some embodiments, the turbine shaft 22 may be a "cold-end drive" configuration, meaning the turbine shaft 22 may connect to the turbine generator 20 at the compressor end of the turbine assembly. In other embodiments, the turbine shaft 22 may be a "hot-end drive" configuration, meaning the turbine shaft 22 may connect to the turbine generator 20 at the turbine end of the turbine assembly.

In some embodiments, the recirculated low oxygen content gas flow 50 may be directed from the turbine 34 through the recirculation loop 52 to a heat recovery steam generator 36 for the generation of steam. A steam turbine may further be configured to generate additional electricity using the steam from the heat recovery steam generator 36, and the steam turbine may be connected to a steam generator. In some embodiments, the steam turbine may be arranged to be connected to the turbine shaft 22. The recirculated low oxygen content gas flow 50 may then be directed back into the recirculation loop 52 to a recirculated gas flow cooler 40. In still other embodiments, the recirculation loop 52 may not contain a heat recovery steam generator 36 and the recirculated low oxygen content gas flow 50 may instead be introduced directly into the recirculated gas flow cooler 40 upon exit from the turbine 34. In some embodiments, the recirculation loop 52 may not comprise the recirculated gas flow cooler 40.

In some embodiments, the recirculated low oxygen content gas flow 50 may be recirculated from the output of the turbine 34 to the input of the turbine compressor 30 using the recirculation loop 52. The recirculated low oxygen content gas flow 50 may be cooled to a suitable temperature before delivery to the turbine compressor 30 using the recirculated gas flow cooler 40. The recirculated gas flow cooler 40 may be incorporated into the recirculation loop 52 anywhere downstream from the turbine 34. In some embodiments, a suitable temperature may be below about 66° C., below about 49° C., or below about 45° C.

In embodiments, at least a second portion of the recirculated low oxygen content gas flow 50 may be extracted from the gas turbine assembly via a recirculated gas flow extraction stream 31. In embodiments, the at least a second portion of the recirculated low oxygen content gas flow 50 may be delivered to a carbon monoxide catalyst unit 102. In some embodiments, the recirculated gas flow extraction stream 31 may be in fluid communication with an output of the turbine compressor 30. In other embodiments, the recirculated gas flow extraction stream 31 may be attached to any point of the recirculation loop 52.

In some embodiments, at least a second portion of the compressed ambient gas flow 25 may be added to the carbon monoxide catalyst unit 102. The at least a second portion of the compressed ambient gas flow 25 may be used by the carbon monoxide catalyst unit 102 to react with carbon monoxide in the at least a second portion of the recirculated low oxygen content gas flow 50 and may thereby produce a high pressure stream of gas 33 comprising carbon dioxide. In some embodiments, the high pressure stream of gas 33 may be delivered to a high pressure heat recovery steam generator 104 that may be located downstream of and in fluid connection with the carbon monoxide catalyst unit 102. Upon receiving the high pressure stream of gas 33, the high pressure heat recovery steam generator 104 may generate steam, which in turn may be used to generate additional electricity using a post-catalyst steam turbine and a post-catalyst steam generator.

In some embodiments, a gas sensing unit 101 may be fluidly connected with the recirculated gas flow extraction stream 31. The gas sensing unit 101 may be used to analyze the content of the at least a portion of the recirculated low oxygen content gas flow 50. In some embodiments, a second gas sensing unit 103 may be fluidly connected to the output of the carbon monoxide catalyst unit 103. The second gas sensing unit 103 may be used to analyze the content of the high pressure stream of gas 33. By providing sensors both upstream of and downstream of the carbon monoxide catalyst unit 103, it may be possible to adjust parameters of the power plant to minimize the production of carbon monoxide by the turbine combustor 32 and to maximize the consumption of carbon monoxide by the carbon monoxide catalyst unit 103 while maintaining a stream comprising carbon monoxide, that is substantially oxygen-free, for enhanced oil recovery applications.

In some embodiments, the gas turbine assembly may further comprise a secondary flow path 27 that may deliver at least a third portion of the recirculated low oxygen content gas flow 50 from the turbine compressor 30 to the turbine 34 as a secondary flow. The secondary flow may be used to cool and to seal the turbine 34, including individual components of the turbine 34 such as the turbine shroud, the turbine nozzle, the turbine blade tip, the turbine bearing support housing, and the like. After cooling and sealing the turbine 34 and any individual turbine components, the secondary flow may be directed into the recirculation loop 52 downstream of the turbine 34.

In some embodiments, the at least a first portion of the compressed ambient gas flow 26 may be further compressed by a booster compressor 24. The turbine booster compressor 24 may be incorporated downstream of and in fluid connection with the main air compressor 12 and upstream of and in fluid connection with the turbine combustor 32.

In still other embodiments, a blower may be fluidly connected to the recirculation loop 52 upstream of or downstream from the recirculated gas flow cooler 40. The blower may be configured to increase the pressure of the recirculated low oxygen content gas flow 50 prior to delivery into the turbine compressor 30 via the recirculation loop 52.

In some embodiments, the main air compressor 12 may further comprise adjustable inlet guide vanes to control the flow of air into the main air compressor 12. Additionally, the turbine compressor 30 may further comprise adjustable inlet guide vanes to control the flow of air into the turbine compressor 30.

In some embodiments, the exemplary power plant arrangement 10 may include a damper door connected to the recirculation loop 52. The damper door may be opened to vent a portion of the recirculated low oxygen gas content flow 50 to the atmosphere.

In some embodiments, the exemplary power plant arrangement 10 may be operated using a method that generates electricity and produces increased amounts of carbon monoxide in the recirculated low oxygen content gas flow 50. The additional carbon monoxide may be converted into additional carbon dioxide by the methods described hereinabove.

In still other embodiments, the exemplary power plant arrangement 10 may be operated using a method that generates electricity using substantially stoichiometric combustion with substantially zero emissions from the power plant.

In other embodiments, the exemplary power plant arrangement 200 may be operated using a method that generates electricity. In addition to operating a main gas turbine assembly as described above, in some embodiments, a method for operating the exemplary power plant arrangement 200 is provided, wherein the compressed ambient gas flow further may be delivered to a slave gas turbine assembly. At least a third portion of the compressed ambient gas flow 66 may be delivered to the slave gas turbine assembly. The at least a third portion of the compressed ambient gas flow 66 may be delivered directly to a slave turbine combustor 72. The at least a third portion of the compressed ambient gas flow 66 may then be mixed with at least a first portion of a slave recirculated low oxygen content gas flow 90 and a slave fuel stream 68 to form a slave combustible mixture. The slave combustible mixture may be burned in the slave turbine combustor 72 to produce the slave recirculated low oxygen content gas flow 90.

In some embodiments, a slave turbine 74 may be driven using the slave recirculated low oxygen content gas flow 90, thereby causing the slave turbine 74 to rotate. As used herein, the term "driven using the recirculated low oxygen content gas flow" may mean the slave recirculated low oxygen content gas flow 90 expands upon exit from the slave turbine combustor 72 and upon entrance into the slave turbine 74, thereby causing the slave turbine 74 to rotate.

In some embodiments, rotation of the slave turbine 74 may cause the slave turbine shaft 62 and also the slave turbine compressor 70 to rotate. The slave turbine shaft 62 may rotate in the slave turbine generator 60, such that rotation of the slave turbine shaft 62 may cause the slave turbine generator 60 to generate electricity. In some embodiments, the slave turbine compressor 70 may be fluidly connected to the slave turbine combustor 72 such that the slave turbine compressor 70 may compress and deliver the slave recirculated low oxygen content gas flow 90 to the slave turbine combustor 72.

As illustrated in FIG. 3, in some embodiments, the slave turbine shaft 62 may be a "cold-end drive" configuration, meaning the slave turbine shaft 62 may connect to the slave turbine generator 60 at the compressor end of the turbine assembly. In other embodiments, the slave turbine shaft 62 may be a "hot-end drive" configuration, meaning the slave turbine shaft 62 may connect to the slave turbine generator 60 at the turbine end of the turbine assembly.

In some embodiments, the slave recirculated low oxygen content gas flow 90 may be directed from the slave turbine 74 through the slave recirculation loop 92 to a slave heat recovery steam generator 76 for the generation of steam. A slave steam turbine may be further configured to generate additional electricity using the steam from the slave heat recovery steam generator 76, and the slave steam turbine may be connected to a slave steam generator. In some embodiments, the slave steam turbine may be arranged to be connected to the slave turbine shaft 62. The slave recirculated low oxygen content gas flow 90 may then be directed back into the slave recirculation loop 92 to a slave recirculated gas flow cooler 80. In still other embodiments, the slave recirculation loop 92 may not contain a slave heat recovery steam generator 76 and the slave recirculated low oxygen content gas flow 90 may instead be introduced directly into the slave recirculated gas flow cooler 80 upon exit from the slave turbine 74. In some embodiments, the slave recirculation loop 92 may not comprise the slave recirculated gas flow cooler 80.

In some embodiments, the slave recirculated low oxygen content gas flow 90 may be recirculated from the output of the slave turbine 74 to the input of the slave turbine compressor 70 using the slave recirculation loop 92. The slave recirculated low oxygen content gas flow 90 may be cooled to a suitable temperature before delivery to the slave turbine compressor 70 using the slave recirculated gas flow cooler 80. The slave recirculated gas flow cooler 80 may be incorporated into the slave recirculation loop 92 anywhere downstream of the slave turbine 74. In some embodiments, a suitable temperature may be below about 66° C., below about 49° C., or below about 45° C.

In some embodiments, at least a second portion of the slave recirculated low oxygen content gas flow 90 may be extracted from the slave gas turbine assembly via a slave recirculated gas flow extraction stream 71. In some embodiments, the at least a second portion of the slave recirculated low oxygen content gas flow 90 may be delivered to a slave carbon monoxide catalyst unit 107. In some embodiments, the slave recirculated gas flow extraction stream 71 may be in fluid communication with an output of the slave turbine compressor 70. In other embodiments, the slave recirculated gas flow extraction stream 71 may be attached at any point of the slave recirculation loop 92.

Turning now to FIG. 4, in some embodiments, at least a fourth portion of the compressed ambient gas flow 65 may be added to the slave carbon monoxide catalyst unit 107. The at least a fourth portion of the compressed ambient gas flow 65 may be used by the slave carbon monoxide catalyst unit 107 to react with carbon monoxide in the at least a third portion of the slave recirculated low oxygen content gas flow 90 and thereby produce a slave high pressure stream of gas 73 comprising carbon dioxide. In some embodiments, the slave high pressure stream of gas 73 may be delivered to a slave high pressure heat recovery steam generator 109 that is located downstream of and in fluid connection with the slave carbon monoxide catalyst unit 107. Upon receiving the slave high pressure stream of gas 73, the slave high pressure heat recovery steam generator 109 may generate steam, which in turn may be used to generate additional electricity using a slave post-catalyst steam turbine and a slave post-catalyst steam generator.

In some embodiments, a slave gas sensing unit 106 may be fluidly connected with the slave recirculated gas flow extraction stream 71. The slave gas sensing unit 106 may be used to analyze the content of the at least a portion of the slave recirculated low oxygen content gas flow 90. In some embodiments, a second slave gas sensing unit 108 may be fluidly connected to the output of the slave carbon monoxide catalyst unit 107. The second slave gas sensing unit 108 may be used to analyze the content of the slave high pressure stream of gas 73.

In some embodiments, the gas turbine assembly may further comprise a slave secondary flow path 67 that may deliver at least a third portion of the slave recirculated low oxygen content gas flow 90 from the slave turbine compressor 70 to the slave turbine 74 as a slave secondary flow. The slave secondary flow may be used to cool and seal the slave turbine 74, including individual components of the slave turbine 74 such as the turbine shroud, the turbine nozzle, the turbine blade tip, the turbine bearing support housing, and the like. After cooling and sealing the slave turbine 74 and any individual turbine components, the slave secondary flow may be directed into the slave recirculation loop 92 downstream of the slave turbine 74.

In some embodiments, the at least a third portion of the compressed ambient gas flow 66 may be further compressed by a slave booster compressor 64. The slave booster compressor 64 may be incorporated downstream of and in fluid connection with the main air compressor 12 and upstream of and in fluid connection with the slave turbine combustor 72.

In still other embodiments, a slave blower may be fluidly connected to the slave recirculation loop 92 upstream of or downstream from the slave recirculated gas flow cooler 80. The slave blower may be configured to increase the pressure of the slave recirculated low oxygen content gas flow 90 prior to delivery into the slave turbine compressor 70 via the slave recirculation loop 92.

In some embodiments, the slave turbine compressor 70 may further comprise adjustable inlet guide vanes to control the flow of air into the slave turbine compressor 70.

In some embodiments, a slave damper door may be connected to the slave recirculation loop 92. The slave damper door may be opened to vent a portion of the slave recirculated low oxygen gas content flow 90 to the atmosphere.

In some embodiments, the method for operating the power plant arrangement comprises operating one gas turbine assembly. In other embodiments, the method for operating the power plant arrangement comprises operating two or more gas turbine assemblies that are fluidly connected by the inter-train conduit 8. In still other embodiments, the method for operating the power plant arrangement comprises operating three or more gas turbine assemblies and one or more additional main air compressors, wherein the additional main air compressors are in fluid connection with each other and with the gas turbine assemblies. In yet other embodiments, the method for operating the power plant arrangement includes substantially stoichiometric combustion. In still other embodiments, the method for operating the power plant arrangement includes substantially zero emissions power production.

Other configurations and methods of operation are provided by U.S. patent applications including "Power Plant and Method of Operation" to Daniel Snook, Lisa Wichmann, Sam Draper, Noemie Dion Ouellet, and Scott Rittenhouse (filed Aug. 25, 2011), "Power Plant and Method of Operation" to Daniel Snook, Lisa Wichmann, Sam Draper, Noemie Dion Ouellet, and Scott Rittenhouse (filed Aug. 25, 2011), "Power Plant Start-Up Method" to Daniel Snook, Lisa Wichmann, Sam Draper, Noemie Dion Ouellet, and Scott Rittenhouse (filed Aug. 25, 2011), "Power Plant and Control Method" to Daniel Snook, Lisa Wichmann, Sam Draper, and Noemie Dion Ouellet (filed Aug. 25, 2011), "Power Plant and Method of Operation" to Predrag Popovic (filed Aug. 25, 2011), "Power Plant and Method of Operation" to Sam Draper and Kenneth Kohl (filed Aug. 25, 2011), "Power Plant and Method of Use" to Daniel Snook, Lisa Wichmann, Sam Draper, and Noemie Dion Ouellet (filed Aug. 25, 2011), "Power Plant and Method of Operation" to Sam Draper (filed Aug. 25, 2011), "Power Plant and Method of Operation" to Lisa Wichmann (filed Aug. 25, 2011), and "Power Plant and Control Method" to Karl Dean Minto (filed Aug. 25, 2011), the disclosures of which are incorporated by reference herein.

It should be apparent that the foregoing relates only to the preferred embodiments of the present invention and that numerous changes and modifications may be made herein without departing from the spirit and the scope of the invention as defined by the following claims and equivalents thereof.

I claim:

1. A power plant arrangement, comprising:
   at least one main air compressor for compressing ambient air into a compressed ambient gas flow; and
   at least one gas turbine assembly, comprising:
      a turbine combustor, fluidly connected to the main air compressor, for mixing at least a first portion of the compressed ambient gas flow with at least a first portion of a recirculated low oxygen content gas flow and a fuel stream to form a combustible mixture and for burning the combustible mixture and forming the recirculated low oxygen content gas flow;
      a turbine connected to the turbine combustor and to a turbine shaft, and being arranged to be driven by the recirculated low oxygen content gas flow from the turbine combustor;
      a turbine compressor, fluidly connected to the turbine combustor, and connected to the turbine shaft and being arranged to be driven thereby;
      a recirculation loop for recirculating the recirculated low oxygen content gas flow from the turbine to the turbine compressor; and
      a recirculated gas flow extraction stream for extracting at least a second portion of the recirculated low oxygen content gas flow from the at least one gas turbine assembly and delivering the at least a second portion of the recirculated low oxygen content gas flow to a carbon monoxide catalyst unit;
   wherein at least a second portion of the compressed ambient gas flow is directed from the at least one main air compressor to the carbon monoxide catalyst unit.

2. The power plant arrangement of claim 1, wherein the at least one gas turbine assembly further comprises at least one gas sensing unit upstream of the carbon monoxide catalyst unit or downstream from the carbon monoxide catalyst unit or both.

3. The power plant arrangement of claim 1, wherein the at least one gas turbine assembly further comprises a high pressure heat recovery steam generator downstream from the carbon monoxide catalyst unit.

4. The power plant arrangement of claim 3, configured to receive a high pressure stream of gas from the carbon monoxide catalyst unit for generation of steam and to generate additional electricity using a post-catalyst steam turbine and a post-catalyst steam generator.

5. The power plant arrangement of claim 1, wherein the at least one gas turbine assembly further comprises a booster compressor for further compressing the at least a first portion of the compressed ambient gas flow.

6. The power plant arrangement of claim 1, wherein the at least one gas turbine assembly further comprises a heat recovery steam generator in the recirculation loop, configured to receive the recirculated low oxygen content gas flow from the at least one gas turbine assembly for the generation of electricity using a steam turbine and a steam generator.

7. The power plant arrangement of claim 1, wherein the at least one gas turbine assembly further comprises a secondary flow path that delivers at least a third portion of the recirculated low oxygen content gas flow from the turbine compressor to the turbine as a secondary flow, and the secondary flow is further delivered into the recirculation loop after cooling and sealing the turbine.

8. The power plant arrangement of claim 1, wherein the power plant is configured for substantially stoichiometric combustion and substantially zero emissions power production.

9. The power plant arrangement of claim 1, wherein the power plant is configured to deliver a stream of high pressure gas comprising carbon dioxide to an oil well for enhanced oil recovery.

10. The power plant arrangement of claim 1, wherein the at least one gas turbine assembly further comprises a recirculated gas flow cooler in the recirculation loop, configured to lower the temperature of the recirculated low oxygen content gas flow to a suitable temperature for delivery to the turbine compressor.

11. A method for operating a power plant, comprising:
compressing ambient air with at least one main air compressor to form a compressed ambient gas flow;
delivering at least a first portion of the compressed ambient gas flow to a turbine combustor of at least one gas turbine assembly;
mixing the at least a first portion of the compressed ambient gas flow with at least a first portion of a recirculated low oxygen content gas flow and a fuel stream to form a combustible mixture and burning the mixture in the turbine combustor to produce the recirculated low oxygen content gas flow;
driving a turbine using the recirculated low oxygen content gas flow;
driving a turbine compressor fluidly connected to the turbine combustor;
recirculating the recirculated low oxygen content gas flow from the turbine to the turbine compressor using a recirculation loop;
extracting at least a second portion of the recirculated low oxygen content gas flow from the gas turbine assembly using a recirculated gas flow extraction stream;
delivering the at least a second portion of the recirculated low oxygen content gas flow to a carbon monoxide catalyst unit;
adding at least a second portion of the compressed ambient gas flow from the at least one main air compressor to the carbon monoxide catalyst unit; and
producing a high pressure stream of gas comprising carbon dioxide with the carbon monoxide catalyst unit.

12. The method of claim 11, further comprising analyzing the composition of the extracted portion of the recirculated low oxygen content gas flow before entry into the carbon monoxide catalyst unit using a first gas sensing unit.

13. The method of claim 11, further comprising analyzing the composition of the high pressure stream of gas after exit from the carbon monoxide catalyst unit using a second gas sensing unit.

14. The method of claim 11, further comprising passing the high pressure stream of gas from the carbon monoxide catalyst unit through a high pressure heat recovery steam generator to generate steam.

15. The method of claim 14, wherein the steam is used to generate additional electricity using a post-catalyst steam turbine and a post-catalyst steam generator.

16. The method of claim 11, wherein the at least one gas turbine assembly further comprises a booster compressor for further compressing the at least a first portion of the compressed ambient gas flow prior to delivery into the turbine combustor.

17. The method of claim 11, further comprising passing the recirculated low oxygen content gas flow through a heat recovery steam generator located in the recirculation loop and configured to generate electricity using a steam turbine and a steam generator.

18. The method of claim 11, further comprising delivering at least a third portion of the recirculated low oxygen content gas flow from the turbine compressor to the turbine via a secondary flow path as a secondary flow, and the secondary flow is further delivered into the recirculation loop after cooling and sealing the turbine.

19. The method of claim 11, further comprising operating the power plant to produce carbon monoxide in the recirculated low oxygen content gas flow.

20. The method of claim 11, further comprising generating electricity with substantially stoichometric combustion and substantially zero emissions from the power plant.

* * * * *